United States Patent [19]
Miller et al.

[11] Patent Number: 5,853,285
[45] Date of Patent: Dec. 29, 1998

[54] COOLING AIR TUBE VIBRATION DAMPER

[75] Inventors: Frederick Martin Miller, Cincinnati; Roger Clayton Walker, Middletown; Christopher Charles Glynn, Hamilton; Martin C. Hemsworth, Cincinnati, all of Ohio

[73] Assignee: General Electric Co., Schenectady, N.Y.

[21] Appl. No.: 872,840

[22] Filed: Jun. 11, 1997

[51] Int. Cl.⁶ .............................. F01D 5/08; F01D 5/10
[52] U.S. Cl. .................. 416/96 R; 416/95; 416/248; 416/500; 415/115; 415/116; 415/119
[58] Field of Search .................... 416/95, 96 R, 416/96 A, 97 R, 145, 248, 500; 415/115, 116, 119

[56] References Cited

U.S. PATENT DOCUMENTS

| | | | |
|---|---|---|---|
| 4,361,213 | 11/1982 | Landis, Jr. et al. | 416/500 |
| 4,576,547 | 3/1986 | Weiner et al. | 415/116 |
| 5,267,832 | 12/1993 | Johnson et al. | 415/115 |
| 5,558,497 | 9/1996 | Kraft et al. | 416/500 |

FOREIGN PATENT DOCUMENTS

| 1020209 | 2/1953 | France | 416/500 |
|---|---|---|---|

*Primary Examiner*—Christopher Verdier
*Attorney, Agent, or Firm*—Nixon & Vanderhye

[57] ABSTRACT

In a compressor rotor assembly including a plurality of rotor disks affixed to a rotor body, and wherein at least one radially directed cooling tube is supported from a radially outer end within a rotor shaft, with an opposite, radially inner free end extending toward a longitudinal axis of the rotor, an improvement comprising a ring member loosely secured to the tube at the free end.

11 Claims, 2 Drawing Sheets

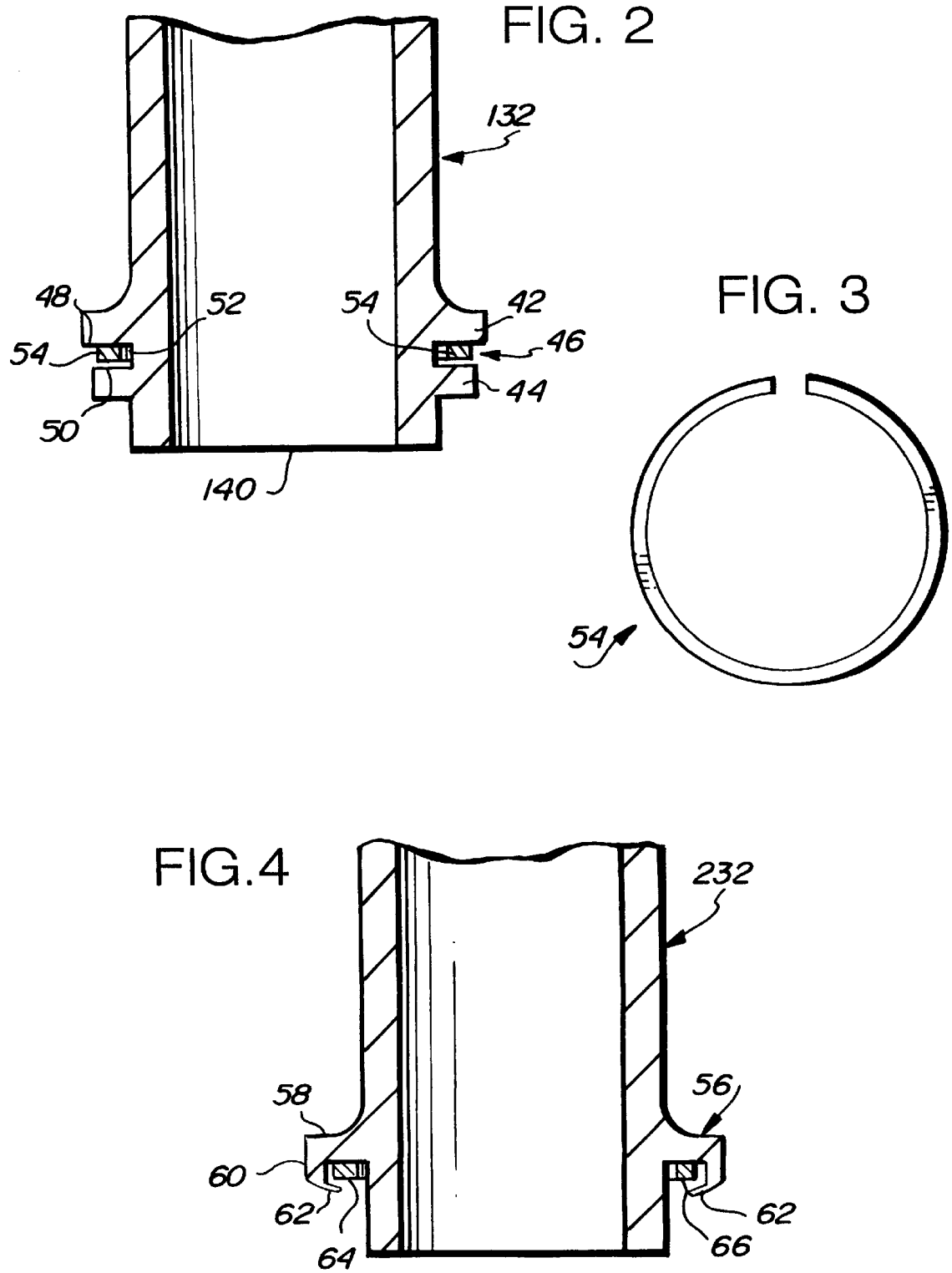

COOLING AIR TUBE VIBRATION DAMPER

TECHNICAL FIELD

This invention relates to compressor rotors in a gas turbine machine, and more specifically, to a vibration damping device for a compressor rotor cooling air tube.

BACKGROUND PRIOR ART

Typically, a set of circumferentially arranged, radially directed tubes deliver cooling air to the compressor rotor. These tubes are cantilevered from the rotor, i.e., supported only at their radially outer ends, and extend in a radial direction toward the rotor axis. As a result, any type of resonance in the cavity above or below the tubes has the potential to interact with the tube mechanical vibration modes and drive the amplitudes to dangerously high levels.

The cooling tube can be designed such that the natural mechanical frequencies are placed away from possible acoustic frequencies. However, since there are so many acoustic modes in tube mechanical modes of concern, it cannot be guaranteed that the tube will be vibration free in the undamped configuration.

In some aircraft engine applications, it has been proposed to utilize a split sleeve tube inside the cooling tube to dampen vibrations, but this is a costly solution of some complexity.

DISCLOSURE OF THE INVENTION

The object of this invention is to provide a mechanism for damping compressor rotor cooling air tube vibration in a simpler and more cost effective manner than the split sleeve tube mentioned above.

In accordance with one embodiment of the invention, a wire ring is installed in a sideways U-shaped groove near the radially inner end of the cooling tube. The wire ring is installed and then retained such that there is free movement of the ring within the groove. Any vibration in the tube caused by unknown force is damped because the inertia force of the ring will resist movement, and the ring will slide relative to the tube within the groove. In an alternative arrangement, a full 360° ring is installed in a groove and a few small circumferentially located tabs are bent or staked over to retain the ring in place.

Thus, in accordance with its broader aspects, the present invention relates to a compressor rotor assembly including a plurality of rotor disks affixed to a rotor body, and wherein at least one radially directed cooling tube is supported from one end within a rotor shaft, with an opposite free end extending toward a longitudinal axis of the rotor, the improvement comprising a ring member loosely secured to the tube at the free end.

Other objects and advantages of the subject invention will become apparent from the detailed description which follows.

BRIEF DESCRIPTION OF THE DRAWINGS

FIG. 2 is a partial section of a cooling tube in accordance with a first exemplary embodiment of the invention;

FIG. 3 is a plan view of a split ring of the type employed in the cooling tube shown in FIG. 2; and FIG. 4 is a partial side section of a cooling tube in accordance with an alternative embodiment of the invention.

BEST MODE FOR CARRYING OUT THE INVENTION

Figure 1:
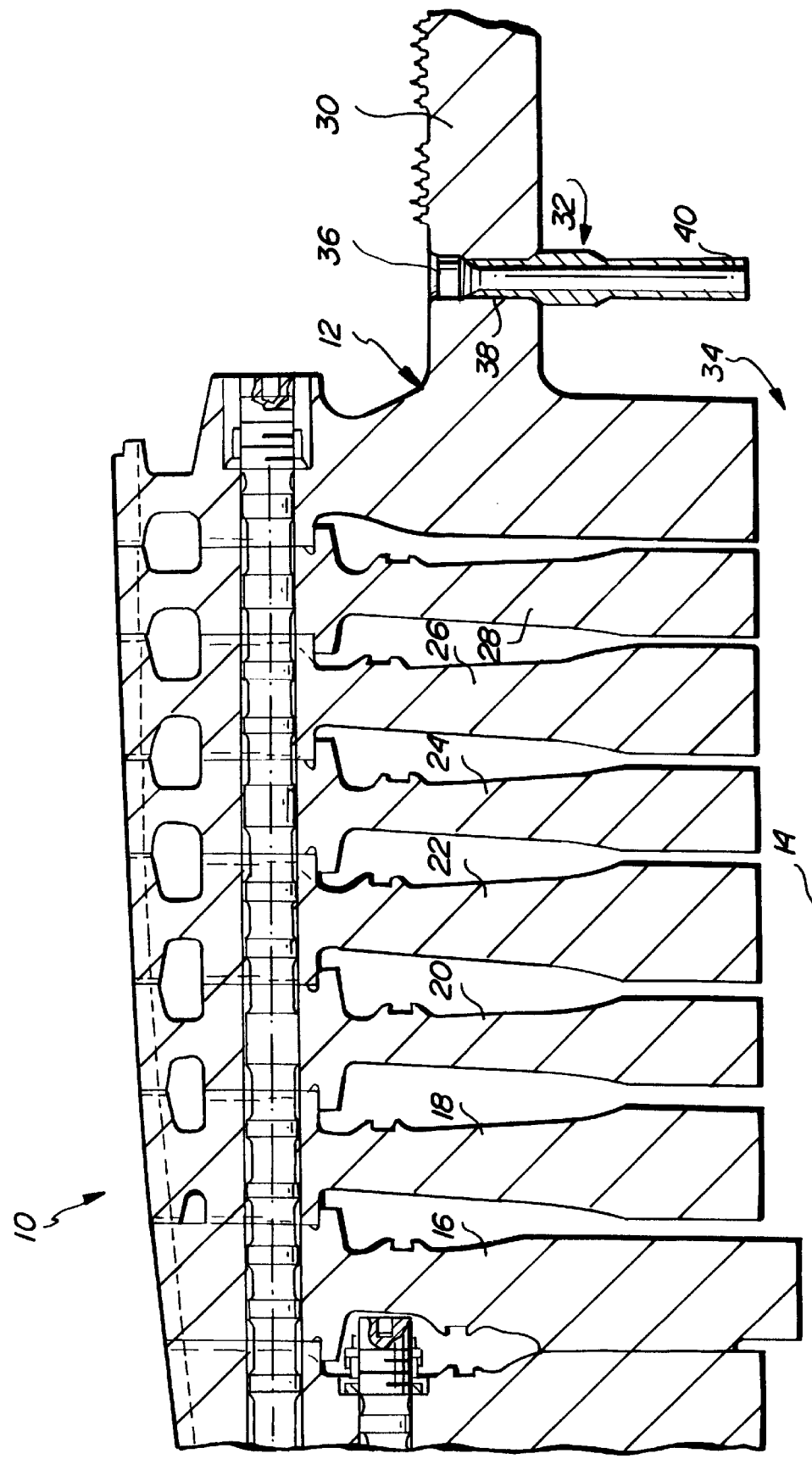
FIG. 1 is a partial side section of a compressor rotor with an installed cooling air tube.

Referring now to FIG. 1, a portion of a compressor 10 is illustrated, the compressor including a rotor assembly generally indicated at 12 which rotates about a longitudinal axis of rotation 14. That portion of the rotor assembly illustrated in FIG. 1 includes a plurality of rotor disks 16, 18, 20, 22, 24, 26 and 28 fixed to the rotor for rotation therewith. A cooling plate 30 of the rotor assembly mounts a plurality of circumferentially spaced, radially arranged cooling tubes (one shown at 32) through which a portion of cooling air supplied to the compressor rotor cavity flows into the rotor bore 34.

The cooling tube 32 is mounted to the compressor cooling plate 30 in a cantilevered arrangement, wherein the radially outer end 36 of the cooling tube is secured within a bore 38 formed in the plate 30. The opposite or radially inner end 40 of the cooling tube is unsupported. As previously noted, any type of resonance in the area immediately above and/or below the cooling plate 30 has the potential to interact with the tube mechanical vibration modes and drive the amplitudes to very high and possibly dangerous levels.

Turning now to FIGS. 2–4, the manner in which this invention provides damping of all mechanical tube vibration modes is illustrated in detail. With reference particularly to FIGS. 2 and 3, the cooling tube 132 has been provided at its lower free end 140 (the radially inner end) with a pair of axially spaced (along the axis of the tube) annular radial flanges 42, 44 to thereby form a sideways U-shaped recess or groove 46 as defined by surfaces 48, 50 and 52. A split ring 54 is installed in the groove 46 by expanding the ring until it snaps into place within the groove. The ring 54, preferably formed of stainless steel, with a square cross-sectional shape, is loosely fit within the groove 46 and can translate horizontally to each side of the groove, but its diameter prevents the ring from falling out of the groove unless it is expanded again. In other words, the diameter of the ring 54 is greater than the tube diameter but smaller than the outer diameters of the flanges 42, 44. Any vibration in the tube 132 caused by any unknown force is damped because the inertia force of the ring 54 will resist movement and, rather, will slide in or relative to the groove 46. More specifically, when the rotor is turning, the ring 54 is forced out against the top portion of the groove, i.e., against surface 52. The ring 54 is held in place by centrifugal force unless there is a significant translational acceleration of the tube end caused by vibration. If the acceleration is large enough, the translational inertia force of the ring 54 will be greater than the friction force holding the ring in place. As a result, the ring 54 will slide relative to the surface 52 of the groove and limit the amplitude of the vibration. The ring 54 is sized such that it will slide when the vibration amplitude of the tube in its first fundamental bending mode is a small fraction of the amplitude required to cause tube failure.

Turning to FIG. 4, an alternative embodiment of the invention is illustrated in which a full 360° ring may be utilized in place of a split ring as shown in FIG. 3. More specifically, the tube 232 is provided at its radial inner end with an annular shouldered flange 56 which has a horizontal surface 58 and vertical or radial surface 60. At the free end of the latter, a plurality of bendable tabs 62 are provided at circumferentially spaced locations about the flange. The closed ring 64 can be installed over the lower free end of the tube 232, and moved into the annular space 66 created by the flange surfaces 58, 60. The bendable tabs 62 are then bent over, as shown in FIG. 4, to prevent escape of the ring 64 from the recess 66. The ring 64 otherwise dampens vibrations in the same manner as the ring 54 described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a compressor rotor assembly including a plurality of rotor disks affixed to a rotor body, and wherein at least one radially directed cooling tube is supported from one end within a rotor shaft, with an opposite free end extending toward a longitudinal axis of the rotor, the improvement comprising a ring member loosely secured to said tube at said free end.

2. The improvement of claim 1 wherein said ring member is located within an annular recess.

3. The improvement of claim 2 wherein said annular recess comprises a sideways U-shaped groove formed by a pair of axially spaced radial flanges.

4. The improvement of claim 2 wherein said annular recess comprises a groove open in a radial inward direction, and further wherein said ring member is held in said recess by a plurality of circumferentially spaced tabs.

5. The improvement of claim 2 wherein said ring member is a split ring.

6. The improvement of claim 4 wherein said ring member is a closed, 360° ring.

7. The improvement of claim 3 wherein said ring member has an inner diameter greater than an outer diameter of the cooling tube and less than the outer diameters of the pair of radial flanges.

8. The improvement of claim 1 wherein said ring member has a square cross section.

9. The improvement of claim 3 wherein said ring member has a square cross section.

10. The improvement of claim 4 wherein said ring member has a square cross section.

11. The improvement of claim 4 wherein said groove is formed by a radial flange having horizontal and vertical surface components, and wherein said ring member has an inner diameter greater than an outer diameter of the tube and less than an inner diameter of said vertical surface component.

* * * * *